(12) United States Patent
Schuft et al.

(10) Patent No.: US 8,231,758 B2
(45) Date of Patent: Jul. 31, 2012

(54) ACRYLIC ADHESIVES

(75) Inventors: Charles F. Schuft, Boxborough, MA (US); Douglas E. Frost, Kingston, NH (US); David N. Mason, Newfields, NH (US)

(73) Assignee: Henkel Corporation, Rocky Hill, CT (US)

( * ) Notice: Subject to any disclaimer, the term of this patent is extended or adjusted under 35 U.S.C. 154(b) by 359 days.

(21) Appl. No.: 12/652,380

(22) Filed: Jan. 5, 2010

(65) Prior Publication Data

US 2010/0101724 A1    Apr. 29, 2010

Related U.S. Application Data

(63) Continuation of application No. PCT/US2008/008290, filed on Jul. 2, 2008.

(60) Provisional application No. 60/948,272, filed on Jul. 6, 2007.

(51) Int. Cl.
| | |
|---|---|
| C04B 37/00 | (2006.01) |
| B32B 7/00 | (2006.01) |
| B29C 47/00 | (2006.01) |
| C08F 220/18 | (2006.01) |
| C08F 220/28 | (2006.01) |

(52) U.S. Cl. .......... 156/325; 156/310; 524/13; 526/319; 526/320; 526/328.5

(58) Field of Classification Search .................... 524/13; 156/325, 310; 526/319, 320, 328.5
See application file for complete search history.

(56) References Cited

U.S. PATENT DOCUMENTS

| | | | |
|---|---|---|---|
| 4,963,220 A | 10/1990 | Bachmann et al. | |
| 5,080,746 A | 1/1992 | Sorg | |
| 5,385,958 A | 1/1995 | Bachmann et al. | |
| 5,512,608 A | 4/1996 | Bachmann et al. | |
| 5,621,032 A | 4/1997 | Cortelezzi et al. | |
| 5,865,936 A * | 2/1999 | Edelman et al. | 156/310 |
| 6,747,076 B2 * | 6/2004 | Schneider et al. | 524/13 |
| 6,784,240 B2 | 8/2004 | Hasegawa et al. | |
| 6,852,801 B1 | 2/2005 | Briggs et al. | |
| 6,984,689 B2 | 1/2006 | Penot et al. | |
| 7,211,616 B2 | 5/2007 | Kaszubski et al. | |
| 2002/0173564 A1 * | 11/2002 | Schneider et al. | 524/72 |
| 2004/0127614 A1 | 7/2004 | Jiang et al. | |
| 2006/0183821 A1 | 8/2006 | Kaspers et al. | |
| 2006/0267238 A1 | 11/2006 | Wang | |

* cited by examiner

*Primary Examiner* — Michael M Bernshteyn
(74) *Attorney, Agent, or Firm* — Steven C. Bauman

(57) ABSTRACT

The present invention relates to two-part, curable, (meth) acrylic adhesives containing naturally occurring fillers which inhibit free radical cure, such as wood flour, and oxygen scavenging components. Also provided are methods of preparing such adhesive compositions and methods of bonding substrates together with such adhesive compositions.

15 Claims, No Drawings

ACRYLIC ADHESIVES

RELATED U.S. APPLICATION DATA

This application continues from International Patent Application No. PCT/US2008/008290, filed Jul. 2, 2008, which claims the benefit of an earlier filing date from U.S. Provisional Application No. 60/948,272, filed Jul. 6, 2007 the disclosures of each of which hereby being expressly incorporated herein by reference.

FIELD OF THE INVENTION

The present invention relates to acrylic adhesives that contain a naturally occurring filler having free radical inhibitive properties, including tannin-containing cellulosic fillers, such as wood flour, and an oxygen scavenger, and methods of use thereof.

BRIEF DESCRIPTION OF RELATED TECHNOLOGY

Curable adhesives, including acrylic adhesive compositions, typically include an inert filler material. Fillers in curable adhesives can improve the working properties, permanence, and strength of the final product. Examples of known fillers are particulates, including alumina trihydrate (ATH), talc, ceramic, rock, and inorganic fillers known to those skilled in the art, ground coal, ground glass, glass beads, particulate plastics, non-catalytic metals, sand, silica, and any non-dissolving particulate that by itself would not have deleterious effects to the performance of the thermoset. Carbonates, including calcium carbonate and magnesium carbonate, including limestone and dolomite, also can be used as a filler in some applications that can tolerate its basic nature.

Organic cellulosic filler materials, such as wood flour, are byproducts of saw mill operations. They are processed by drying and grinding to a fine mesh. The use of wood flour in non-acrylic adhesive systems has been disclosed. For example, in U.S. Pat. No. 7,211,616, the use of wood flour is disclosed in moisture curable adhesives containing reactive silicon end groups. Similarly, U.S. Patent Application Publication No. 2006/0267238 discloses the use of wood flour in polymeric composites as a wood or wood-like substitute material.

U.S. Patent Application Publication No. 2006/0183821 relates to a method of treating wood flour as a filler in a composite material, by treating the wood flour with an impregnating composition, which requires an aqueous solvent and a sterically hindered amine component.

U.S. Patent Application Publication No. 2004/0127614 discloses wood flour as a filler in adhesive systems. The adhesive systems of the '614 Publication contain a substantial amount of $C_3$-$C_{40}$ olefins and have a specified "Dot T-Peel" value.

Ordinarily, naturally occurring fillers have the disadvantage of complicated biological chemistry that may be deleterious to the reaction or performance of free radical curing thermoset systems. For example, the tannins in wood flour are chemically akin to phenolic inhibitors and the like that are synthesized and used commercially, though not in acrylic adhesive systems. Although wood flour is known as a filler for use in adhesive systems, it is not known to have been incorporated into acrylic adhesive systems. To date, acrylic adhesives have not been able to employ naturally occurring fillers, such as wood flour, without significant loss of reactivity in the adhesive mixtures prior to mixing. More specifically, previous attempts to employ wood flour as a filler material in two-part acrylic adhesive systems have failed, due to loss of reactive activity within days of storage at room temperature. Decomposition of the component containing wood flour is even more rapid at elevated temperatures of 100° F. If the wood flour-containing component decomposes, the adhesive will not cure. There is a need, therefore, for acrylic adhesives that incorporate naturally occurring fillers, such as wood flour, yet maintain their reactivity and ability to cure after reasonable storage prior to mixing.

SUMMARY OF THE INVENTION

The present invention provides compositions and methods that permit the incorporation of naturally occurring fillers, including tannin-containing cellulosic fillers, such as wood flour, into acrylic adhesives, that provide adhesives that perform to standards satisfied by known inorganic fillers. The present invention provides for the addition of oxygen scavengers that will mollify the deleterious inhibitive effects of naturally occurring fillers on the cure speed of acrylic adhesives, even after reasonable periods of storage.

The present invention relates to a two-part acrylic adhesive composition, employing a first part containing a (meth)acrylate component, and a second part containing a naturally occurring filler which inhibits free radical cure and at least one oxygen scavenging component. The composition further includes a cure system in either the first part, the second part or both the first and second parts. For the purpose of brevity and ease of example, the explanations below will focus on those naturally occurring fillers that are tannin-containing cellulosics. However, other naturally occurring fillers not technically encompassed by the terminology "tannin-containing" or "cellulosic" may be inhibitive of free radical curing, and such effects are expected to be mollified by the use of oxygen scavenging moieties, and are intended to be included herein. A typical tannin-containing cellulosic filler is wood flour, which has tannins that have not been removed. Suitable oxygen scavenging components are, for example, triphenylphosphine (TPP) and dihydropyridine (DHP) compounds.

In another embodiment, the present invention provides a two-part system where the first part contains a (meth)acrylate component, a naturally occurring filler which inhibits free radical cure, and at least one oxygen scavenging component, and the second part contains a cure system selected from free radical initiators, catalysts and combinations thereof.

In some aspects of this invention, both parts may contain a naturally occurring filler.

In another embodiment, the present invention provides a method of preparing an acrylic adhesive including the steps of:

(a) providing a first part including at least one (meth)acrylate component and a cure system;

(b) providing a second part including a naturally occurring filler which inhibits free radical cure and at least one oxygen scavenger; and (c) mixing the first and second parts to form a curable composition.

In another aspect, the present invention provides a method of bonding at least two substrates together including the steps of:

(a) providing a first part containing at least one (meth)acrylate component and a cure system;

(b) providing a second part including a naturally occurring filler which inhibits free radical cure and at least one oxygen scavenger;

(c) mixing the first and second parts to form a curable composition;

(d) applying the curable composition to at least one surface of one or more of the substrates; and (e) matingly engaging the surfaces of the substrates together and permitting the composition to cure to form a bond therebetween.

DETAILED DESCRIPTION OF THE INVENTION

For purposes of this invention, the term "naturally occurring fillers" will include biologically-derived fillers, including fillers made from wood or nut shells, which contain chemical compounds that, in the presence of a free-radical curing composition, inhibit free radical curing. Due to the presence of these chemical compounds, addition of such fillers to free radical curable acrylic systems is inhibited. The term "tannin-containing cellulosic filler" is used herein interchangeably with the term "naturally occurring fillers" and thus has the same scope and meaning.

The present invention provides materials and formulations that permit tannin-containing cellulosic filler materials, such as wood flour, to be used in free radical curable acrylic adhesives, which has previously not been feasible. Thus, the present invention provides a curable acrylic adhesive composition containing a tannin-containing cellulosic filler material, such as wood flour, at least one oxygen scavenger, such as TPP, and a cure system.

More specifically, in some embodiments, this invention provides a two-part curable acrylic adhesive composition, where the first part contains a (meth)acrylate component. The second part contains a tannin-containing cellulosic filler material, such as wood flour, and at least one oxygen scavenger. The composition also includes a cure system capable of initiating the cure reaction. The two parts cure when mixed. In this aspect, the second part is chemically stable for an extended storage period, for example, 30 days at 100° F.

In other embodiments, this invention provides a two part curable adhesive composition, in which the first part contains a (meth)acrylate component, a tannin-containing cellulosic filler material, such as wood flour, and at least one oxygen scavenger. The second part of the composition contains a cure system, such as a catalyst and/or free radical initiator, so that a curable adhesive is formed when the first and second parts are mixed. In this embodiment, the first part is chemically stable for an extended storage period, for example, at least 30 days at 100° F.

By the term "cure system" is meant catalysts, free radical initiators, and the like, that are employed in the art of free radical curable adhesives to cure the adhesive composition and thereby form an adhesive bond between two or more surfaces. A typical component of such a cure system is a peroxide initiator.

By the term "wood flour" is meant finely ground particles of wood, non-limiting examples of which are pine, oak, or maple. Additionally, a flour from ground walnut shells can be used in this invention. Wood flour is obtained from saw mill waste, by taking saw dust, drying it, and grinding it to a desired particle size distribution, e.g. about 325 mesh. The wood flour obtained by this method may have the consistency of ordinary wheat flour used in baking foods. A particular advantage to wood flour is low cost. As a product derived from an industrial waste stream, it typically can be obtained for less than $0.20 per pound or there about based upon 2007 industry cost figures.

However, as mentioned above, wood has not been compatible with acrylic adhesives. Accordingly, it has been generally accepted that two part acrylic adhesives are not suitable for bonding wood materials. Similarly, wood flour has not been useful as a filler material for conventional two-part acrylic adhesives. Without meaning to be bound by a particular theory, it has been hypothesized that the tannins in wood cause decomposition of acrylic adhesives prior to mixing, and inhibit the setting and cure of acrylic adhesives after mixing.

More specifically, gallic acid, which contains a trihydroxyphenyl group, is a major component of tannin. It has been hypothesized that the phenolic compounds in tannin both cause decomposition of acrylic monomers and inhibition of the cure of acrylic adhesives. Additionally, it has been hypothesized that the inhibition and decomposition of acrylic adhesive components by tannin is enhanced by dissolved oxygen. Accordingly, the instant applicants have discovered that the use of oxygen scavengers inhibits the decomposition of acrylic components prior to mixing, and also inhibits the poisoning of the cure of acrylic adhesives by tannin containing materials.

To achieve this effect, oxygen scavengers, such as triphenylphosphine (TPP), when added to the acrylic adhesive component containing wood flour, effectively preserves the quality of the composition for an extended period and provides a finished thermoset with excellent characteristics. TPP is an oxygen scavenger, so the successful addition of TPP to acrylic adhesives containing wood flour is consistent with the theory that dissolved oxygen activates or enhances the gallic acid, gallate esters, phenolic, or tannin related inhibitor moiety mediated decomposition of acrylic adhesive components.

In some more specific aspects, this invention provides a two-part curable acrylic adhesive composition, where the first part contains a (meth)acrylate component, a free radical inhibitor and at least one organic peroxide. Also provided is a second part containing a monomer that forms a curable adhesive with the (meth)acrylate of the first part, such as another acrylate, an epoxide, or an acrylonitrile monomer, and a tannin-containing cellulosic filler material, such as wood flour, at least one oxygen scavenger, and a catalyst capable of initiating the cure reaction. The two parts cure when mixed. In this aspect, the second part is chemically stable for an extended storage period, at least 30 days at 100° F.

In some other more specific aspects, the present invention provides a two-part curable adhesive composition, in which the first part contains a (meth)acrylate component, optionally a free radically curable monomer or monomers, a tannin-containing cellulosic filler material, such as wood flour, and at least one oxygen scavenger. In this aspect, the second part of the composition contains a catalyst and initiator, with or without a monomer, that forms a curable adhesive with the monomer of the first part when both parts are mixed and allowed to cure.

In addition, optional additives may be present in any of the adhesive compositions described herein. For example, one part may contain a free radical inhibitor that prevents premature reaction of the (meth)acrylate component with itself, and a reactive acid component, such as a phosphate ester. A second part may contain an amine component, which may be used to catalyze and promote the curing reaction, and a catalyst, such as a bismuth salt.

In two-part acrylic adhesives, either part can contain a free radical initiator such as a peroxide, which activates the curing reaction, however, in aspects of this invention in which the one part contains oxygen scavengers, the peroxide component, if employed, will be in the other part, i.e., without the tannin-containing cellulosic filler and oxygen scavenger.

In addition, other components that are conventional to two part thermoset adhesives may be added, as will be explained more fully below.

First Part

In the following description, the terms "first part" and "second part" refer to an embodiment where the peroxide and (meth)acrylate are in the first part and the filler and oxygen scavenger(s) are in the second part. However, alternative embodiments can be prepared, for example with the filler and oxygen scavenger(s) in the first part, where the second part essentially only contains catalysts and initiators.

(Meth)Acrylic Components

The first part, and optionally the second part of the composition, contains a (meth)acrylate component, which may be any suitable material which contains at least one group having the general structural formula I.

$$H_2C=CGCO_2R^2 \quad (I)$$

where G may be hydrogen, halogen or alkyl of 1 to about 4 carbon atoms, and $R^2$ may be selected from alkyl, cycloalkyl, alkenyl, cycloalkenyl, alkenyl, aralkyl or aryl groups 6 to about 16 carbon atoms, any of which may be optionally substituted or interrupted as the case may be with oxygen, halogen, carbonyl, hydroxyl, ester, carboxylic acid, urea, urethane, carbonate amine, amide, sulfur, sulfone and the like.

In another, particularly desired embodiment, the (meth) acrylates have general structural formula II:

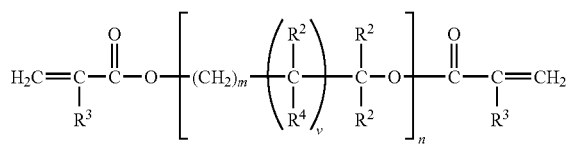

where $R^2$ may be selected from hydrogen, alkyl of 1 to about 4 carbon atoms, hydroxyalkyl of 1 to about 4 carbon atoms or

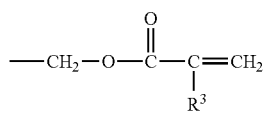

$R^3$ may be selected from hydrogen, halogen, and alkyl of 1 to about 4 carbon atoms;

$R^4$ may be selected from hydrogen, hydroxy and

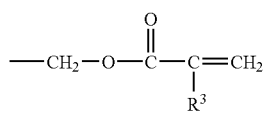

m is an integer equal to at least 1, e.g., from 1 to about 8 or higher, for instance, from 1 to about 4;

n is an integer equal to at least 1, e.g., 1 to about 20 or more; and v is 0 or 1.

Advantageously, the group is a (meth)acryloxy group. The term "(meth)acryloxy" or "(meth)acrylate" is intended to refer to both acrylate and methacrylate, in which R is H or methyl, respectively. The useful amount of (meth)acrylic component(s) typically range(s) from about 20% by weight to about 80% by weight of the first part of the composition. Desirably, the compositions contain from about 50% by weight to about 70% by weight of (meth)acrylic component, or about 60% by weight of (meth)acrylic component in the first part of the composition.

The (meth)acrylic component may be present in the form of a polymer, a monomer, or a combination thereof. When present in the form of a polymer, the (meth)acrylic component may be a polymer chain to which is attached at least one of the above-indicated groups. The groups may be located at a pendant or a terminal position of the backbone, or a combination thereof. Advantageously, at least two such groups may be present, and may be located at terminal positions. The (meth)acrylic polymer chain may be polyvinyl, polyether, polyester, polyurethane, polyamide, epoxy, vinyl ester, phenolic, amino resin, oil based, and the like, as is well known to those skilled in the art, or random or block combinations thereof.

Advantageously, the polymer chain of the (meth)acrylate may be formed by polymerization of vinyl monomers. Illustrative examples of such vinyl monomers are methyl (meth) acrylate, (meth)acrylic acid, ethyl(meth)acrylate, n-propyl (meth)acrylate, isopropyl (meth)acrylate, n-butyl(meth) acrylate, isobutyl(meth)acrylate, tert-butyl(meth)acrylate, n-pentyl (meth)acrylate, n-hexyl(meth)acrylate, cyclohexyl (meth)acrylate, n-heptyl (meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, tolyl(meth)acrylate, benzyl (meth)acrylate, 2-methoxyethyl(meth)acrylate, 3-methoxybutyl(meth)acrylate, 2-hydroxyethyl (meth)acrylate, 2-hydroxypropyl(meth)acrylate, stearyl(meth)acrylate, glycidyl(meth)acrylate, 2-aminoethyl (meth)acrylate, γ-(methacryloyloxypropyl)trimethoxysilane, (meth)acrylic acid-ethylene oxide adduct, trifluoromethylmethyl(meth)acrylate, 2-trifluoromethylethyl (meth)acrylate, 2-perfluoroethylethyl(meth)acrylate, 2-perfluoroethyl-2-perfluorobutylethyl (meth)acrylate, 2-perfluoroethyl(meth) acrylate, perfluoromethyl(meth)acrylate, diperfluoromethylmethyl(meth)acrylate, 2-perfluoromethyl-2-perfluoroethylmethyl (meth)acrylate, 2-perfluorohexylethyl (meth)acrylate, 2-perfluorodecylethyl(meth)acrylate, 2-perfluorohexadecylethyl(meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylolpropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth) acrylate and ethoxylated bisphenol A di(meth)acrylate. These monomers may be used each alone or a plurality of them may be copolymerized.

To further promote adhesion, especially to metals, a polymerizable acid such as methacrylic acid may be added to the first part, in amounts ranging from about 0.01% to about 15% based on the total weight of the first part. Desirably, the polymerizable acid is used in about 1% to about 10% by weight of the first part, or in about 2% to about 4% by weight of the first part. Other useful polymerizable acids are acrylic acid, maleic acid, itaconic acid, and other copolymerizable unsaturated acids of this type that are well known to those skilled in the art.

Thermoset Elastomeric Components

The acrylic adhesive compositions also may include a thermoset elastomeric component in the first part. The thermoset elastomeric component may be a chlorosulfonated polyethylene synthetic rubber, such as "Hypalon® 20," or an ABS resin, such as "Blendex® 338," or a mixture of these materials. U.S. Pat. No. 6,852,801, which is incorporated by reference herein, provides a description of these materials and the advantageous properties they provide to acrylic adhesives. Chlorosulfonated polyethylene synthetic rubber is a toughener for acrylic adhesives. These elastomers are a blend of monomeric materials which polymerize in the glue line to become an integral part of an adhesive assembly. While the synthetic rubber elastomers resemble epoxies and polyurethane adhesives functionally, they differ technologically from these materials by using free radical propagation curing rather than curing by stoichiometric polymerization reactions. For this reason, they are robust to variation in mix ratio of the first part to the second part and do not require as careful metering and mixing for full efficiency. The adhesives incorporating chlorosulfonated polyethylene synthetic rubber are characterized by providing excellent high peel and shear strength along with close to instant bonding speeds. In addition, the adhesives are able to bond through oil surfaces without the need for careful surface preparation prior to bonding.

Acrylonitrile-butadiene-styrene (ABS) and methacrylate-acrylonitrile-butadiene-styrene (MABS) solution or molding grade resins also may be used in the compositions of this invention, especially in conjunction with the chlorinated rubber components.

The chlorosulfonated polyethylene synthetic rubber, if used, can be employed in up to about 50% by weight of the first part. Desirably, the rubber component is used in about 5% to about 30% by weight, or in about 10% to about 25% by weight, or about 20% by weight of the first part.

The ABS resin, if used, can be employed in up to about 30% by weight of the first part. Desirably, the ABS resin is employed in about 5% to about 20% by weight of the first part, or about 12% by weight of the first part.

Free Radical Inhibitor

The first part of the adhesive composition also may employ a free radical polymerization inhibitor, which prevents the first part from reacting prematurely prior to mixing. The use of a free radical inhibitor allows the first part to be blended and shipped in drums, and remain stable for a period of months prior to use.

The free radical inhibitor component also prevents the other components of the first part from reacting with each other. This may be desirable, because both the first and second parts may be produced in large quantities, and stored and shipped in containers such as drums, for use as an adhesive at customer sites. It is desirable that the products survive shipping and arrive ready for mixing. Moreover, as the reaction is exothermic, premature reaction, such as during transit, could be a safety hazard.

Numerous suitable free-radical polymerization inhibitors are known in the art, and include quinones, hydroquinones, hydroxylamines, nitroxyl compounds, phenols, amines, arylamines, quinolines, phenothiazines, and the like. Particularly useful free radical inhibitors include hydroquinone, tertiary butylhydroquinone (TBHQ), hydroxyethylhydroquinone, phenothiazine, and "Naugard®-R" blend of N-alkyl substituted p-phenylenediamines (from Crompton Corp.). One or more individual free radical inhibitor components may be combined in this invention.

If employed, the free radical inhibitor may be present in up to 5% by weight of the first part. Desirably, it is used in about 0.5% by weight of the first part.

Reactive Acid Component

The first part of the adhesive compositions also may include an acid or acid ester, which act as an adhesion promoter, and accelerates the curing reaction after the first and second parts are combined. Suitable acids or acid esters include phosphoric acid or derivatives, phosphate acid esters, and sulfonic acids or derivatives. A preferred reactive acid component is a phosphate acid ester.

Suitable phosphate esters for use in the first part of the adhesive composition invention include those represented by the formula:

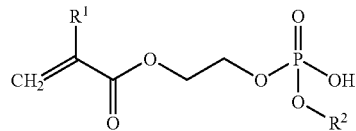

where $R^1$ is H or $CH_3$, and $R^2$ is H or a radical represented by the structure:

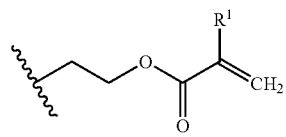

where $R^1$ is H or $CH_3$. A particularly useful phosphate ester for use in the present invention is 2-hydroxyl ethyl methacrylate (HEMA) phosphate ester, which is sold under the tradename T-MULZ® 1228, available from Harcros Chemicals, Kansas City, Kans. Also included are structures with at least one strong acid "active hydrogen" group, or with at least one phosphoric acid active hydrogen group ($R_1R_2POOH$), such as hydroxyl ethyl diphosphonic acid, phosphonic acid, and derivatives, or oligomeric or polymeric structures with phosphonic acid functionality or similar acid strength functionality.

In the present invention, the reactive acid or the phosphate ester component, if used, is present in up to about 5% to 10% by weight of the first part. Desirably, the phosphate ester is present from about 0.1 to 3% by weight of the first part.

Wax Component

In some embodiments, a wax may be added to the first part of the adhesive composition. For instance, paraffin wax and the like may be employed. The addition of a paraffin wax can extend the open time of the composition, by preventing "skin over" from MMA evaporation before the cure is complete. A paraffin wax melting at 60-62° C., such as Wax 1977A from IGI, Agincourt, Ontario, Canada is suitable. If used, the wax is present in amounts of about 0.4% by weight of the first part of the composition.

Additional Optional Additives

Various other additives may be employed in the first part of the adhesive compositions of this invention. For example, ethylenediamine tetracetic acid (EDTA) and/or its salt, e.g. sodium salt can be added in about 0.4% by weight to the first part, and acts to chelate catalytic metal impurities that can have a deleterious effect on the curing reaction. In some embodiments, hydroxyethylethylenediamine triacetic acid (HEDTA) is used instead of EDTA, which is more soluble in MMA. Saccharin may be added to the first part of the composition as a co-accelerator to improve the cure and post cure properties of acrylic adhesives. If present, saccharin may be used in about 0.1% to 5% by weight of the first part, or more preferably, in about 1% by weight of the first. Butylated hydroxytoluene (BHT) is often employed as an antioxidant to promote the stability of the (meth)acrylate resin, and if present, is used in about 0.2% to about 4% by weight of the first part of the composition. Hydrophilic and/or hydrophobic silica and/or fumed silica, such as the product sold under the trade name "Cabosil M5," may be used to impart thixotropic characteristics to the composition. Fumed silica may be added to the first part of the composition, for instance, in about 0.1% to 2.0% by weight. A color additive also may be used.

Second Part

As mentioned above, in some embodiments, the second part of the adhesive composition includes a tannin-containing cellulosic filler, such as wood flour, and oxygen scavenger(s). In other alternative embodiments, the second part includes only the cure system, and optional additives, and the tannin-containing cellulosic filer and oxygen scavenger(s) are present in the first part of the adhesive composition. Therefore, although not limited to being present in the second part, the tannin-containing cellulosic fillers and oxygen scavengers are described in more detail in this section.

Naturally Occurring Fillers

As noted above, the present invention provides acrylic adhesive compositions that include naturally occurring fillers, including tannin-containing cellulosic fillers, such as wood flour, and are capable of maintaining their reactivity. In some embodiments, the wood flour is added to the second part of the composition. Typically, the wood flour is used in about 5% to 50% by weight of the second part of the composition, or about 10% to 30% by weight of the second part, or about 20% by weight of the second part.

In some alternative embodiments of this invention, the wood flour and oxygen scavengers are in the first part, containing the (meth)acrylate monomers. In such embodiments, the second part contains catalysts, initiators, and peroxide components necessary to effect the curing reaction. The wood flour and oxygen scavengers may be present in the same amounts in the first part as disclosed herein for use in the second part.

Oxygen Scavenger Components

As noted above, the addition of oxygen scavengers to the adhesive compositions described herein is believed to prevent decomposition of (meth)acrylic components prior to mixing, and during the curing reaction, caused by phenolic components in tannin in wood. It is believed that the decomposition reactions caused by tannins are significantly enhanced by or require dissolved oxygen in the composition mixture. Thus, removing dissolved oxygen with one or more oxygen scavengers prevents decomposition of the (meth)acrylate resins and permits the use of wood flour as a filler. Removing dissolved oxygen with oxygen scavenger(s) also permits the adhesives of the instant invention to have an improved bond to natural wood materials, which has not previously been practical in the art of acrylic adhesives, where significant bond strength has been desired.

A particularly suitable oxygen scavenger for use herein is a phosphine or a phosphine derivative, an oxygen scavenging phosphine derivative, or other oxygen scavenging phosphorous derivative. Phospines react with oxygen to form the phosphine oxide. For example, TPP is a particularly preferred phosphine that is very effective in the adhesives of the instant invention. In some embodiments, TPP may be used in amounts of about 0.1% to 2.0% by weight of the second part of the composition, or in about 0.2% to about 0.5%, or about 0.35% by weight of the second part.

Another suitable oxygen scavenging component is a dihydropyridine derivative, including for example, dihydrophenylpyridine, also referred to as phenyldihydropyridine or PDHP, dihydroquinoline, dihydroisoquinoline, or other readily oxidized partially aromatic nitrogen containing compounds. A preferred dihydropyridine additive is that prepared from the condensation of butyraldehyde and aniline, which forms 3,5-diethyl-1,2-dihydro-1-phenyl-2-propylpyridine, a PDHP product. Commercially available forms of PDHP include "Reillcat® P50" and "Reilly PDHP," by Vertellus Specialties, Inc, Indianapolis, Ind. Another example is marketed by R.T. Vanderbilt under the tradename "Vanax® 808." Another example is "Vulkacit® 576," sold by Lanxess Corp. These condensates are also marketed as vulcanization accelerators.

Other aldehyde/amine condensation products also have oxygen scavenging activity, including the product of heptaldehye and aniline, sold as "Hepteen® Base," by Crompton Chemicals. Another variation is "Vanax® 833," the product of butylamine and butyraldehyde, from Vanderbilt. Other amine aldehyde condensation products are disclosed in U.S. Pat. Nos. 5,385,958, 6,984,689 and 5,621,032, the contents of which are incorporated by reference.

Hydroxyl amines are also suitable oxygen scavenging components for use herein. In particular, alkyl hydroxyl amines, such as isopropyl hydroxylamine are effective oxygen scavenging components.

Preferably, the aldehyde/amine condensates will be selected which have a content or purity of 1,2-DHP (% by weight) which is as high as possible, preferably greater than 50%, more preferably greater than 70%.

In some embodiments, PDHP component may be used in amounts of about 0.5% to about 10% by weight of the second part of the composition. Preferably, PDHP is present in amounts of about 1.0% to about 5.0% by weight of the second part of the composition.

(Meth)Acrylic Components

In some embodiments, a (meth)acrylate component also is added to the second part. The specific (meth)acrylates useful in the second part are the same as in the first part and are discussed above. If present in the second part, the resin may be used in about 40% to 80% by weight of the second part. Desirably, the resin is used in about 50% to 60% by weight of the second part of the composition.

Vinyl Ethers

In some embodiments, a vinyl ether may be added to the second part. In combination with the oxygen scavengers and basic metal catalyst, the vinyl ether plays a role in neutralizing the destructive effects of tannins on the acrylic adhesive composition. A typical vinyl ether useful in this invention is bis-(4-vinyl oxy butyl) adipate sold under the trade name "VEctomer® 4060" by Morflex, Inc., Greensboro, N.C. The vinyl ether is believed to act as an acid scavenger, and thus many varieties of vinyl ether may be used, such those sold by BASF Corporation, for example, 4-hydroxy butyl vinyl ether and/or its esters. If used, the vinyl ether is balanced with other ingredients, such as TPP and the bismuth catalyst to modulate the long term stability, and other properties, such as the open time. "Open time" refers to the period after mixing the two parts, but prior to the time when the mixture sets and hardens. In particular, with the use of "VEctomer® 4060," TPP, and "BiCAT V®," the open time of the second part after 12 weeks storage at 100 F before mixing with the first part can be made virtually identical with the second part that is freshly prepared. This is an important manufacturing advantage, allowing batches of the second part to be prepared in advance and stored for months, (simulated by the accelerated aging for several weeks at 100 F), before use without concern over decomposition or failure of a mixture of the first and second parts to cure.

If present, the vinyl ether is used in amounts of about 0.2% to 30% by weight of the second part of the composition, or desirably, about 10% by weight of the second part of the composition.

Additional Optional Additives

Other components that may be added to the second part of the instant compositions are the same wax component as in the first part; an ABS elastomer, such as Blendex 338, discussed above in relation to the first part, which adds certain physical characteristics to the final cured product that may be desirable; a coloring component; and silica or fumed silica, discussed above in relation to the first part, which provides thixotropic characteristics to the composition.

Cure System

The adhesive compositions also include a cure system. The cure system may include free radical initiators, catalysts and the like and combinations thereof. The cure system may be present in the first and/or second part of the composition, depending upon which part includes the oxygen scavenger(s). In particular, peroxide free radical initiator(s) will be present in a separate part from the oxygen scavenger(s) because otherwise the oxygen scavenger(s) will react with the oxidizer forms of free radical initiator(s), i.e. peroxides. Therefore, in embodiments including wood flour and oxygen scavenger(s) in the second part, the free radical initiator is in the first part. Catalysts, such as basic metal catalysts or transition metal catalysts, may be present in either part of the composition, as may be selected by those skilled in the art.

Suitable free radical initiators, particularly peroxide initiators, and catalysts are described in more detail below.

Free Radical Initiator

A number of well known initiators of free radical polymerization may be incorporated in the present invention. Among those included, without limitation, are peroxide compounds such as cumene hydroperoxide (CHP); tert-butyl peroxybenzoate (TBPB); t-butylhydroperoxide (TBH), methyl ethyl ketone peroxide; benzoyl peroxide; acetyl peroxide; 2,5-dimethylhexane-2,5-dihydroperoxide; di-tert-butyl perphthalate; dicumyl peroxide; 2,5-dimethyl-2,5-bix(tert-butylperoxide) hexane; 2,5-dimethyl-2,5-bis(tert-butylperoxy)hexyne; bix (tert-butylperoxyisopropyl)benzene; di-t-butyl peroxide; 1,1-di(tert-amylperoxy)-cyclohexane; 1,1-di-(tert-butylperoxy)-3,3,5-trim-ethylcyclohexane; 1,1-di-(tert-butylperoxy)-cyclohexane; 2-di-(tert-butylperoxy)butane; n-butyl-4, 4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicar-bonate; lauryl peroxide; 2,5-dimethyl-2,5-bis(2-ethyl-hexanoyl peroxy) hexane; p-menthane hydroperoxide; diisopropylbenzene hydroperoxide; pinene hydroperoxide; t-amyl peroxy-2-ethylhexanoate. Additionally, one or more of the peroxides from this list may be combined. Particularly preferred peroxide components of this invention are combinations of CHP and TBPB.

Non-peroxide free radical initiators may also be employed, such as, for example, 2,2'-azobis(2-methyl-propionitrile), 2,2'-azobis(2,4-methylbutanenitrile), or even in some cases a radiation cure initiator, or co-initiator.

A particular feature of the present invention is that the oxygen scavenger component, necessary for the use of the naturally occurring filler, such as the tannin-containing cellulosic component, must be in a different part of the composition than the peroxide component. The oxygen scavenger would otherwise react with the peroxide. Thus, with the use of oxygen scavengers in one part of this invention, the peroxide selection in the other part is critical, because the oxygen scavengers will tend to neutralize the active peroxide as storage progresses. In particular, addition of CHP to the first part can restore reactivity lost due to the oxygen scavengers consumption of any active oxygen species that may be in the second part. Typically, the ratio of TBPB to CHP is about 10:1 to 15:1, and the total peroxide content of the first part is about 1% to about 2% by weight of the first part.

Catalysts

Thermoset acrylic adhesive compositions such as the present invention may typically employ a basic metal component to co-catalyze the curing reaction by attracting components that impede the reaction progress. This metallic component is desirably selected from zinc complexes, or bismuth complexes, for example bismuth subsalicylate, bismuth (III) oxide, bismuth aluminate, bismuth subcarbonate, "BiCAT Z®," (a zinc carboxylate mixture from Shepard Chemical Co., Norwood, Ohio.), "BiCAT V®," (bismuth carboxylate mixture from Shepard Chemical Co.), or "BiCAT 8®," (bismuth/zinc neodecanoate mixture from Shepard Chemical Co.). Additionally, one or more of these basic metal complexes may be combined. A preferred catalyst is "BiCAT V®." The catalyst may be used in about 0.1% to 1.0% by weight of the second part of the composition, or about 0.25% by weight of the second part.

In addition to the basic metal component, a transition metal catalyst, such as a copper salt or chelate, can be added to accelerate the curing reaction and decrease the open time. The copper may be a copper carboxylate, copper naphthenate, copper acetate, copper octoate, copper laurate, copper benzoate, fatty acid salts of copper, copper formate, copper metal, copper acetyl acetonate, 2,4-pentanedione copper complex, any other analogous copper compounds, alloys, amalgams, and copper derivatives known to those skilled in the art. Other metals such as cobalt, iron, vanadium, and the like may also be employed as is well known to those skilled in the art.

For example, the formula in Example 4, below, has no copper additive, and has an open time of about 20 minutes. By contrast the formula of Example 3, below, has 0.1% copper, and the open time is about 3-6 minutes. If present, copper salts may be added in about 0.01% to 0.2% by weight of the second part.

Methods of Preparing and Using the Adhesive Compositions

The present invention also is directed to methods of preparing acrylic adhesives. In accordance with such methods, a first part and a second part, as described above, are provided. The first and second parts are mixed together to form a curable composition.

It is generally contemplated that the two parts of the acrylic adhesive compositions of this invention will be used in about a 1:1 ratio by weight, but the ratio depends on the components and may vary. In other embodiments, the ratio of components may be 5:1, 10:1, or higher. The two parts are mixed, and thorough mixing may be shown by an appropriate color blend, so for example if the first part is blue and the second part is yellow, the appropriately mixed composition will be green. Depending on the application, the "open time," meaning the period after mixing but prior to the time when the mixture sets and hardens, can be adjusted by varying the amount of catalysts, peroxide components, vinyl ether in the second part, and other parameters. Generally, the open time will be at least 5 minutes, but may be as long as several hours in the case of large jobs where applying the adhesive to a substrate can take substantial time. In addition, the viscosity of the mixture can be adjusted by varying the amounts of monomer versus the viscosity increasing ingredients, e.g. the elastomeric components, such as the rubber or ABS resin additive.

The adhesives of this invention are useful for bonding parts, substrates, or components in the manufacture of industrial machinery, or for other bonding uses. In the case of modern windmill blades, airfoil surfaces may be bonded with the adhesive of this invention to an internal framework that is stationed within the blade in a completed blade arm. For example, a windmill blade will typically have an upper half and a lower half airfoil surface. The two surfaces are manufactured separately and mated to each other as well as to an optional internal framework with the adhesive of this invention. Other applications where the inexpensive and strong adhesives of this invention are useful is in the manufacture of automobile, boat, and aircraft parts, including hand or machine application, injection or surface bead application, and other methods known to those skilled in the art. Additionally, household uses are contemplated, such as repair of furniture, bonding of toys, and bonding in construction.

The adhesives of this invention may be useful for preparing laminates, in which a fabric, which may be glass, polyester, or another material, is impregnated with the adhesive to form moldable laminated sheets.

EXAMPLES

Example 1

A two-part adhesive composition was prepared in accordance with the present invention. The components listed in Table 1 below were combined in the indicated amounts to provide Part 1 and Part 2 of the composition.

TABLE 1

| First Part | Weight fraction |
| --- | --- |
| Chlorosulfonated polyethylene synthetic rubber[1] | 0.1100 |
| Methylmethacrylate | 0.6147 |
| MA Acid | 0.0200 |
| BHT | 0.0050 |
| EDTA sodium salt | 0.0010 |
| Saccharin | 0.0150 |
| MEHQ | 0.0050 |
| 2-ethylhexyl methacrylate | 0.0400 |
| ABS resin[2] | 0.1700 |
| Paraffin wax[3] | 0.0040 |
| Fumed silica[4] | 0.0067 |
| Cumene Hydroperoxide | 0.0006 |
| Keyplast Blue A | 0.0001 |
| TBPB | 0.0080 |
| Total | 1.0000 |

[1]Hypalon 30
[2]BLENDEX 338
[3]WAX 1977
[4]Cabosil M5

| Second Part | Weight fraction |
| --- | --- |
| MMA | 0.5013 |
| PDHP | 0.0435 |
| Fumed silica[1] | 0.0050 |
| TPP | 0.0035 |
| Bismuth carboxylate mixture[2] | 0.0025 |
| Bis-(4-vinyl oxy butyl) | 0.1000 |

TABLE 1-continued

| adipate[3] | |
| --- | --- |
| Maple wood flour | 0.2000 |
| Yellow color | 0.0002 |
| ABS resin[4] | 0.1400 |
| Paraffin wax[5] | 0.0040 |
| Total | 1.0000 |

[1]Cabosil M5
[2]BiCat V
[3]Vectomer 4060
[4]BLENDEX 338
[5]WAX 1977

After preparing parts 1 and 2 by combining the above-indicated components, the parts are mixed in a 1:1 ratio. This adhesive has an open time of approximately 20 minutes. This adhesive composition successfully incorporates maple flour as a filler without significant loss of reactivity over time.

Example 2

A two-part adhesive composition was prepared in accordance with the present invention. The components listed in Table 2 below were combined in the indicated amounts to provide Part 1 and Part 2 of the composition.

TABLE 2

| First Part | Weight fraction |
| --- | --- |
| MMA | 0.6097 |
| Chlorosulfonated polyethylene synthetic rubber[1] | 0.1971 |
| HQ | 0.0050 |
| EDTA sodium salt | 0.0005 |
| BHT | 0.0130 |
| MA Acid | 0.0400 |
| ABS resin[2] | 0.1050 |
| Paraffin wax[3] | 0.0040 |
| 2-hydroxyl ethyl methacrylate (HEMA) phosphate ester[4] | 0.0030 |
| TBPB | 0.0100 |
| CHP | 0.0007 |
| Colorant[5] | 0.0100 |
| Fumed silica[6] | 0.0020 |
| Total | 1.0000 |

[1]Hypalon 20
[2]Blendex 338
[3]Wax 1977
[4]T-Mulz 1228
[5]VC-10000M (available from American Colors, Inc., Sandusky, Ohio)
[6]Cabosil TS-610

| Second Part | Weight fraction |
| --- | --- |
| MMA | 0.6002 |
| Bismuth carboxylate mixture[1] | 0.0025 |
| Triphenyl phosphine | 0.0035 |
| Maple wood flour | 0.2000 |
| ABS resin[2] | 0.1500 |
| Paraffin wax[3] | 0.0040 |
| PDHP[4] | 0.0300 |
| Copper solution | 0.0007 |
| Black dispersion (RV-0262) | 0.0016 |
| Fumed silica[5] | 0.0075 |
| Total | 1.0000 |

[1]Bicat V
[2]BLENDEX 338
[3]WAX 1977
[4]Reillcat PDHP
[5]Cabosil TS-610

After preparing parts 1 and 2 by combining the above-indicated components, the parts are mixed in a 1:1 ratio. This adhesive has an open time of approximately 5 minutes. This adhesive composition successfully incorporates maple flour as a filler without significant loss of reactivity over time.

Example 3

A two-part adhesive composition was prepared in accordance with the present invention. The components listed in Table 3 below were combined in the indicated amounts to provide Part 1 and Part 2 of the composition.

TABLE 3

| First Part | Weight fraction |
|---|---|
| MMA | 0.5942 |
| Chlorosulfonated polyethylene synthetic rubber[1] | 0.1971 |
| HQ | 0.0050 |
| EDTA sodium salt | 0.0005 |
| BHT | 0.0130 |
| MA Acid | 0.0400 |
| ABS resin[2] | 0.1200 |
| Paraffin wax[3] | 0.0040 |
| 2-hydroxyl ethyl methacrylate (HEMA) phosphate ester[4] | 0.0030 |
| TBPB | 0.0100 |
| CHP | 0.0007 |
| Colorant[5] | 0.0100 |
| Fumed silica[6] | 0.0025 |
| Total | 1.0000 |

[1]Hypalon 20
[2]Blendex 338
[3]WAX 1977
[4]T-Mulz 1228
[5]VC-10000M
[6]Cabosil TS-610

| Second Part | Weight fraction |
|---|---|
| MMA | 0.5874 |
| Bismuth carboxylate mixture[1] | 0.0025 |
| TPP | 0.0035 |
| Maple wood flour | 0.2000 |
| ABS resin[2] | 0.1650 |
| Paraffin wax[3] | 0.0040 |
| PDHP[4] | 0.0300 |
| Copper acetate | 0.0010 |
| Black dispersion (RV-0262) | 0.0016 |
| Fumed silica[5] | 0.0050 |
| Total | 1.0000 |

[1]Bicat V
[2]BLENDEX 338
[3]WAX 1977
[4]Reillcat PDHP
[5]Cabosil TS-610

After preparing parts 1 and 2 by combining the above-indicated components, the parts are mixed in a 1:1 ratio. This adhesive has an open time of approximately 5 minutes. This adhesive composition successfully incorporates maple flour as a filler without significant loss of reactivity over time.

Example 4

A two-part adhesive composition was prepared in accordance with the present invention. The components listed in Table 4 below were combined in the indicated amounts to provide Part 1 and Part 2 of the composition.

TABLE 4

| First Part | Weight fraction |
|---|---|
| Chlorosulfonated polyethylene synthetic rubber[1] | 0.1300 |
| MMA | 0.6054 |
| MA ACID | 0.0400 |
| BHT | 0.0200 |
| HEDTA | 0.0010 |
| Saccharin | 0.0100 |
| MEHQ | 0.0100 |
| 2-hydroxyl ethyl methacrylate (HEMA) phosphate ester[2] | 0.0200 |
| Colorant[3] | 0.0100 |
| CHP | 0.0100 |
| ABS resin[4] | 0.1300 |
| Paraffin wax[5] | 0.0040 |
| Fumed silica[6] | 0.0096 |
| Total | 1.0000 |

[1]Hypalon 30
[2]T-Mulz 1228
[3]VC-10000M
[4]BLENDEX 338
[5]WAX 1977
[6]Cabosil M5

| Second Part | Weight fraction |
|---|---|
| MMA | 0.5894 |
| PDHP | 0.0250 |
| Fumed silica[1] | 0.0038 |
| Maple wood flour | 0.2000 |
| Bismuth carboxylate mixture[2] | 0.0025 |
| Black dye (RV-0262) | 0.0016 |
| TPP | 0.0035 |
| Copper naphthenate in methyl methacrylate[3] | 0.0002 |
| ABS resin[4] | 0.1700 |
| Paraffin wax[5] | 0.0040 |
| Total | 1.0000 |

[1]Cabosil M5
[2]Bicat V
[3]IM2231
[4]BLENDEX 338
[5]WAX 1977

After preparing parts 1 and 2 by combining the above-indicated components, the parts are mixed in a 1:1 ratio. This adhesive has an open time of approximately 20 minutes. This adhesive composition successfully incorporates maple flour as a filler without significant loss of reactivity over time.

Example 5

A two-part adhesive composition was prepared in accordance with the present invention. The components listed in Table 5 below were combined in the indicated amounts to provide Part 1 and Part 2 of the composition. This is the "reverse chemistry" example, with HEMA and a reducing agent (DMPT) in the first part, no MMA in the second part, and a peroxide in the second part.

TABLE 5

| First Part | Weight fraction |
|---|---|
| Methyl Methacrylate | 0.2660 |
| Hydroxyethyl methylmethacrylate (HEMA) | 0.2660 |
| Methacrylic Acid | 0.0220 |
| EDTA sodium salt | 0.0010 |
| MEHQ | 0.0001 |

TABLE 5-continued

| | |
|---|---|
| Phenothiazine | 0.0010 |
| ABS resin[1] | 0.0712 |
| Styrene-butadiene block copolymer[2] | 0.1002 |
| Maple wood flour | 0.2316 |
| Paraffin wax[3] | 0.0038 |
| DMPT | 0.0050 |
| 2-hydroxyl ethyl methacrylate (HEMA) phosphate ester[4] | 0.0200 |
| Yellow color | 0.0030 |
| Fumed silica[5] | 0.0091 |
| Total | 1.0000 |

[1]BLENDEX 338
[2]Vector 2411P
[3]Wax 1977
[4]T-Mulz 1228
[5]Cabosil M5

| Second Part | Weight fraction |
|---|---|
| Benzoyl peroxide[1] | 0.4700 |
| Bisphenol A epoxide[2] | 0.2100 |
| Benzoate plasticizer[3] | 0.2028 |
| Polyethylene particulates[4] | 0.1150 |
| Blue pigment | 0.0022 |
| Total | 1.0000 |

[1]Varox ANS
[2]Epon 828
[3]Benzoflex 2088
[4]UFP 1000/Econopoly 2, N1

After preparing parts 1 and 2 by combining the above-indicated components, the parts are mixed in a ten to one, (10:1), ratio. This adhesive has an open time of approximately 30 minutes. TPP also may be added to the first part in an amount of about 0.007 (weight fraction). This adhesive composition successfully incorporates maple flour as a filler without significant loss of reactivity over time.

The invention claimed is:

1. A two-part free radical curable acrylic adhesive composition comprising:
   (a) a first part comprising at least one (meth)acrylate component; and
   (b) a second part comprising:
      (i) a naturally occurring filler selected from the group consisting of wood flour and walnut shell flour which inhibits free radical cure;
      (ii) at least one oxygen scavenger, and
      (iii) a monomer that forms a curable adhesive with the (meth)acrylate component of the first part, wherein at least one of the first part, or the second part also includes a cure system.

2. The composition of claim 1, wherein the cure system is selected from the group consisting of free radical initiators, catalysts and combinations thereof.

3. The composition of claim 1, wherein the naturally occurring filler is present in amounts of about 1% to about 50% by weight of the composition.

4. The composition of claim 1, wherein the at least one oxygen scavenger is selected from the group consisting of phosphines, amines, and mixtures thereof.

5. The composition of claim 1, wherein the at least one oxygen scavenger comprises triphenylphosphine.

6. The composition of claim 1, wherein the at least one oxygen scavenger comprises an alkyl hydroxylamine or a salt or complex thereof.

7. The composition of claim 1, wherein the at least one oxygen scavenger comprises isopropyl hydroxylamine or a salt or complex thereof.

8. The composition of claim 1, wherein the at least one oxygen scavenger comprises a dihydropyridine derivative or a dihydroquinoline derivative.

9. The composition of claim 1, wherein the at least one oxygen scavenger comprises phenyl dihydropyridine or a derivative thereof.

10. The composition of claim 1, wherein the at least one oxygen scavenger is a mixture of two or more oxygen scavenging compounds.

11. The composition of claim 1, wherein the at least one oxygen scavenger comprises a combination of triphenylphosphine and phenyl dihydropyridine.

12. The composition of claim 1, wherein the at least one oxygen scavenger is present in amounts of about 0.01% to about 5% by weight of the composition.

13. The composition of claim 1, wherein the second part is chemically stable for at least 30 days at 100° F. prior to mixing with the first part.

14. A method of preparing the acrylic adhesive composition of claim 1 comprising the steps of:
   (a) providing a first part comprising at least one (meth)acrylate component and a cure system;
   (b) providing a second part comprising a naturally occurring filler selected from the group consisting of wood flour and walnut shell flour which inhibits free radical cure and at least one oxygen scavenger; and
   (c) mixing the first and second parts to form a curable acrylic adhesive composition.

15. A method of bonding at least two substrates together using the acrylic adhesive composition of claim 1 comprising the steps of:
   (a) providing a first part containing at least one (meth)acrylate component and a cure system;
   (b) providing a second part comprising a naturally occurring filler which inhibits free radical cure and at least one oxygen scavenger;
   (c) mixing the first and second parts to form a curable composition;
   (d) applying the curable composition to at least one surface of one or more of the substrates; and
   (e) matingly engaging the surfaces of the substrates together and permitting the composition to cure to form a bond therebetween.

* * * * *